United States Patent Office 3,206,521
Patented Sept. 14, 1965

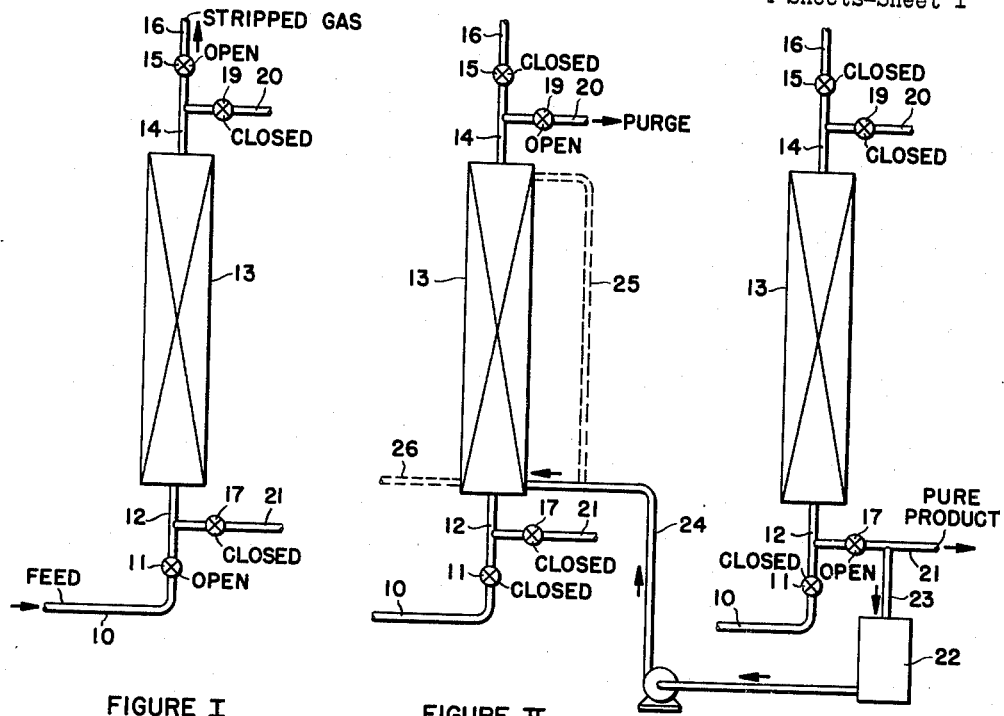
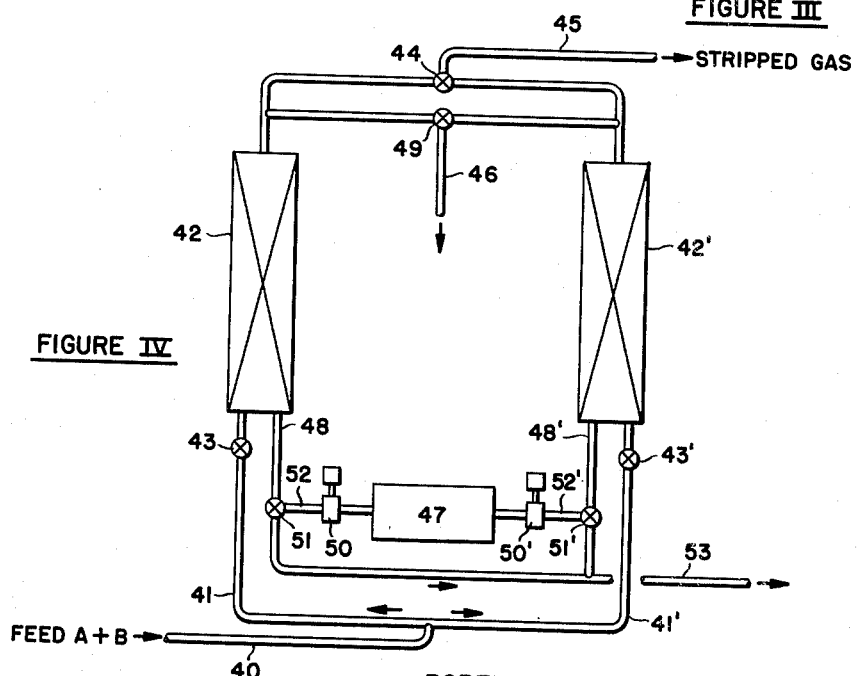

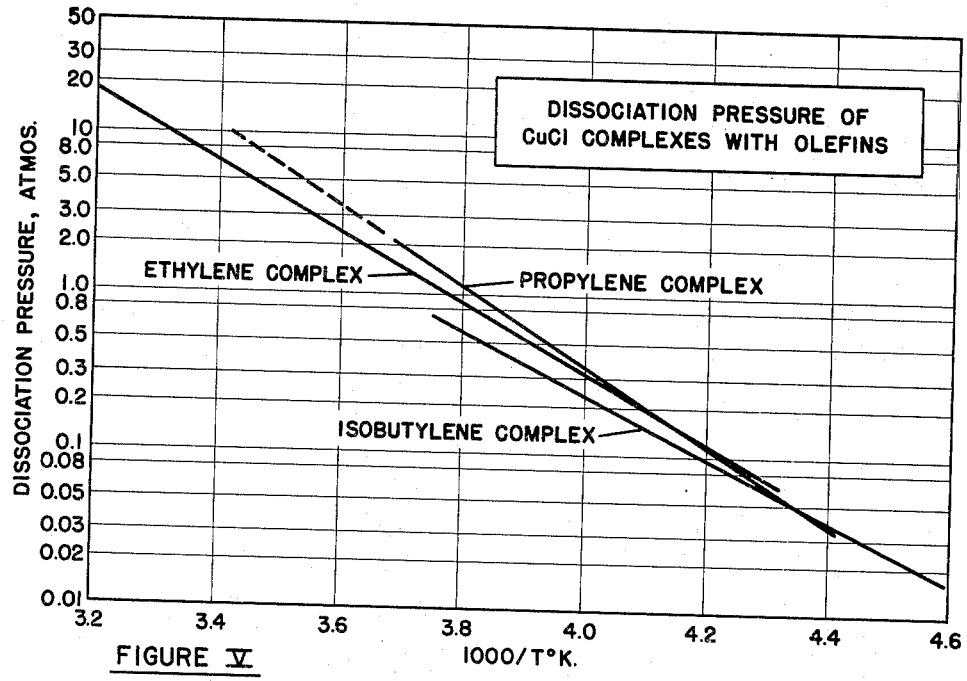
FIGURE V
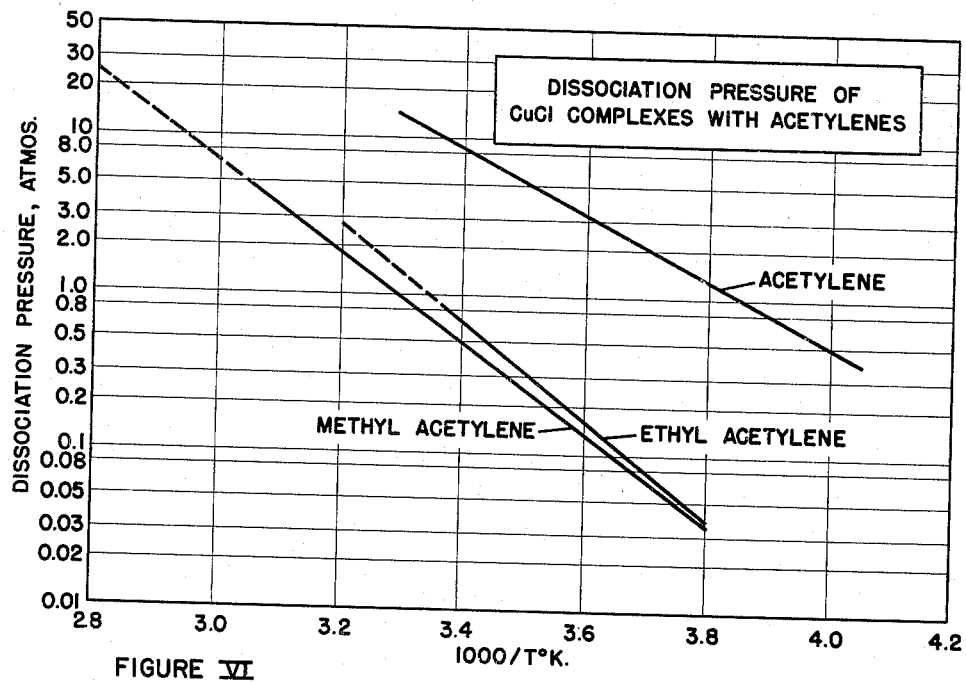
FIGURE VI

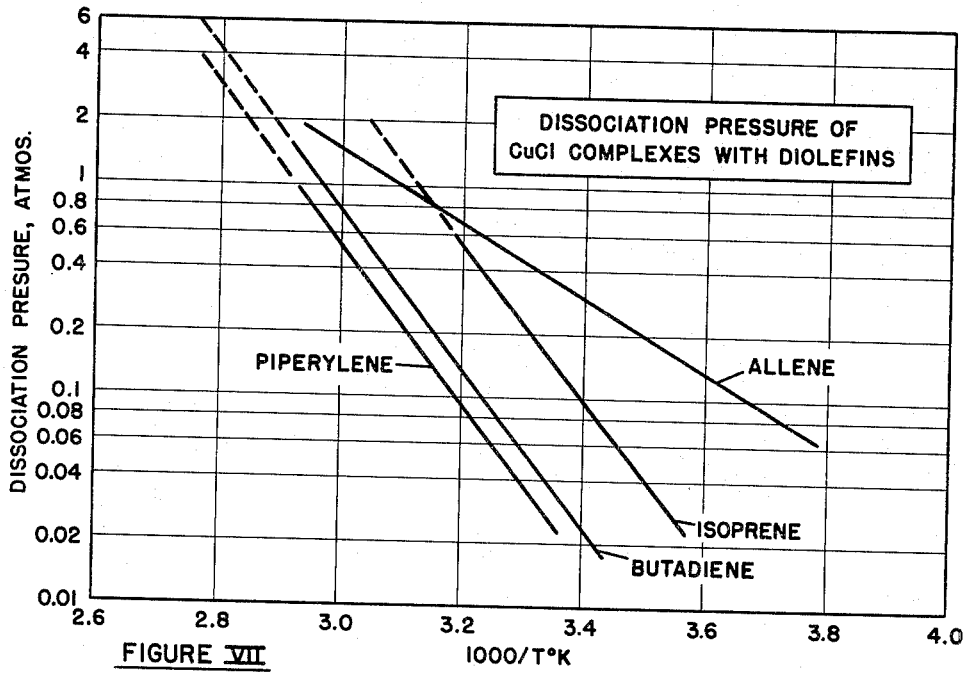
FIGURE VII
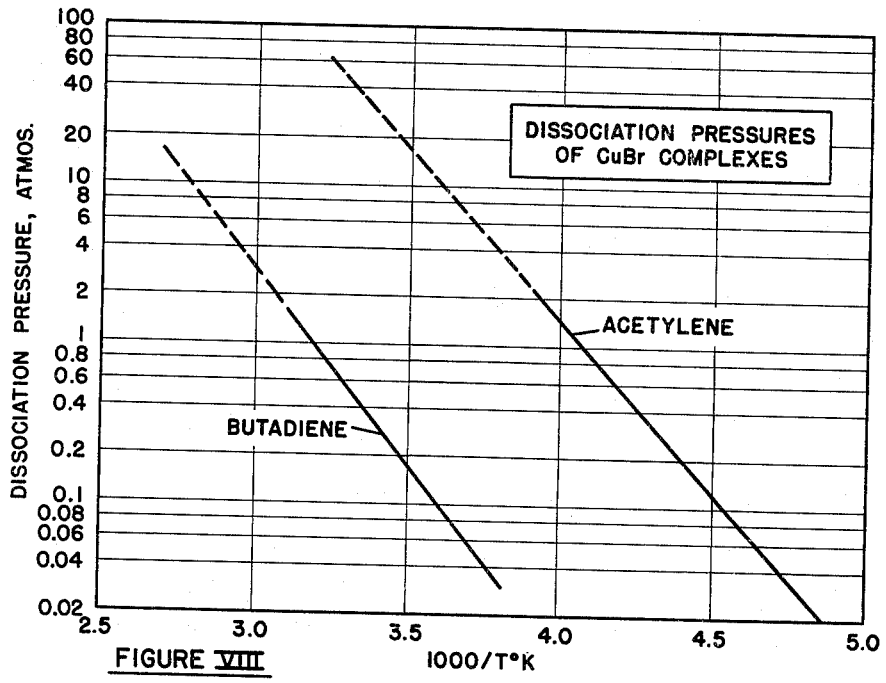
FIGURE VIII

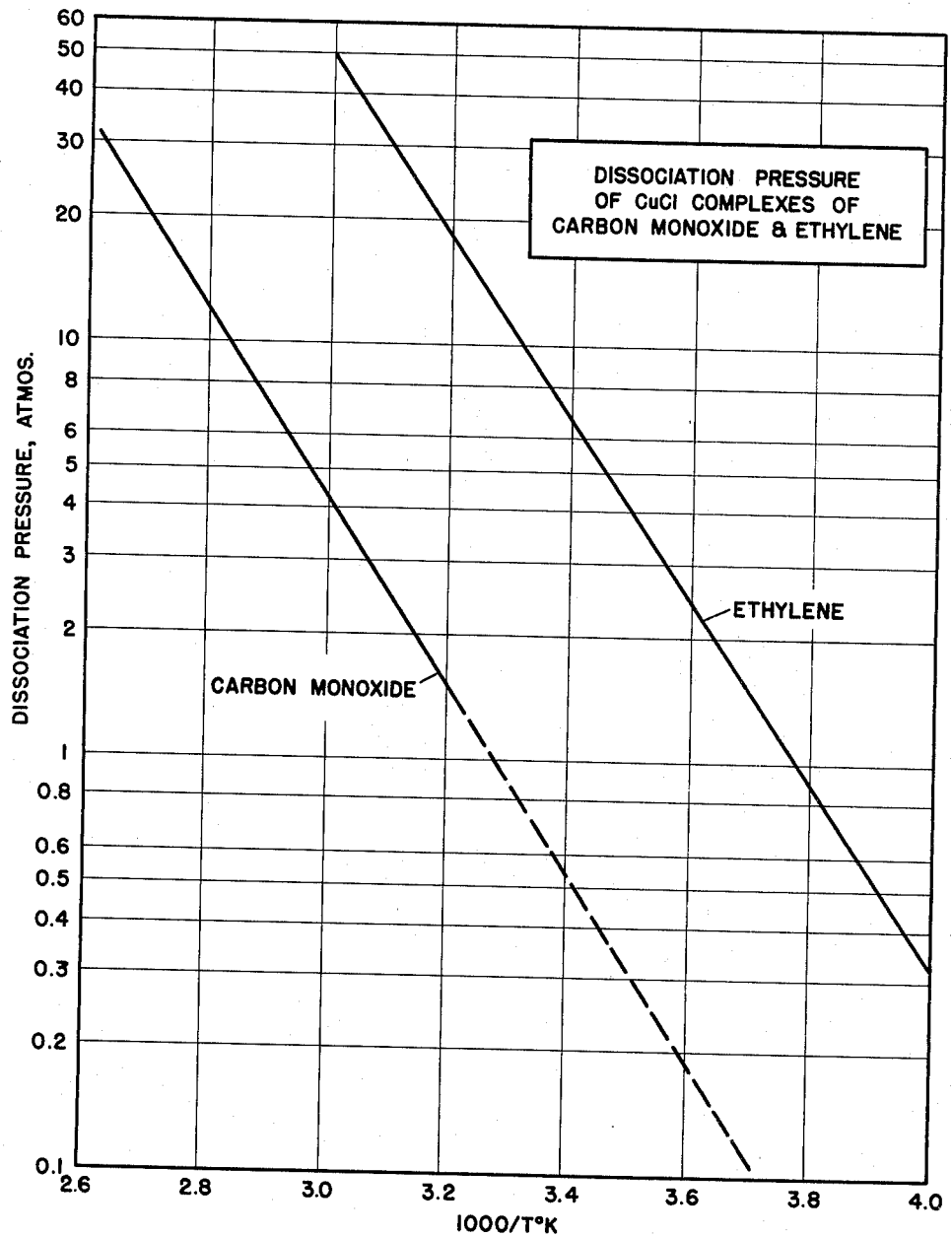
FIGURE IX

3,206,521
SEPARATION OF HYDROCARBONS
Robert B. Long, Wanamassa, N.J., assignor to Esso Research and Engineering Company, a corporation of Delaware
Filed June 8, 1961, Ser. No. 115,684
7 Claims. (Cl. 260—681.5)

This invention relates to a process for the separation of a compound from a mixture containing it involving the use of a solid complexing agent in a rapid pressure cycle process.

More particularly, this invention relates to a process for the separation of a compound boiling below about 100° C. and capable of forming a complex with certain solid complexing agents, from a mixture containing it, which comprises contacting the mixture in vapor phase with the complexing agent for a short period of time and under conditions which will effect the selective formation of the desired complex, removing at least a portion of the uncomplexed components and then maintaining reduced pressures to dissociate the complex.

It is well known in the art that certain solid salts such as cuprous chloride and in general salts of Group I–B and periods 5 and 6 metals of Group VIII–B (Hubbard Rev. Ed. 1956), are capable of forming complexes with certain hydrocarbons especially those having some degree of unsaturation. With this knowledge, the prior art has suggested the use of such solid complexing agents in processes for the separation of hydrocarbons according to the degree of unsaturation involved. For example, it has been suggested that olefins may be separated from diolefins by contact with solid cuprous chloride with subsequent decomposition of the complex to recover the complexed component. These prior art processes involving the use of complexing agents have several drawbacks. The primary difficulty encountered relates to the fact that the formation of the complex itself is a highly exothermic reaction and under ordinary conditions a gaseous feed being passed over the solid complexing agent would soon rise in temperature above the point at which the complex could form under the particular pressures employed. It is, of course, possible in a vapor phase system to mechanically refrigerate the bed; however, this is considered impractical since the heat of reaction occurs at the surface of the particles where the complex is being formed and in a fixed bed system the internally located particles do not have sufficient proximity to the coolant to permit an adequate control of the conditions. For these reasons the prior art has mostly concerned itself with separations of this type using a liquid mixture where temperature control is less of a problem. For the above and other reasons, processes using solid complexing agents to separate hydrocarbons have not met with commercial acceptance.

It is an object of this invention to provide a novel, practical and economic process for the separation of one or more components from a low boiling hydrocarbon-containing stream, e.g. boiling at less than about 100° C., by the use of a rapid pressure cycling system to be defined in detail hereinafter.

Since the process described herein is amenable to the separation of many different types of compounds, for the sake of convenience in describing the invention, the primary components will be identified as A and B. A will represent a compound capable of complexing with one or more of the solid complexing agents referred to, and B will represent a second component which may or may not be capable of complexing with the same complexing agents. In the event that B is able to form complexes with said complexing agents, it is essential that the dissociation conditions for the B complex be substantially different than the dissociation conditions for the A complex. It is to be understood that other components may be present to the extent that they do not interfere with the complexing and dissociation mechanisms involved in the separation of A from B.

To more clearly understand the use of these abbreviations, in one instance A may represent ethylene and B ethane. In another instance, A may represent butadiene and B butene, and so forth. In any event the process will entail the use of pressure equipment which in a simplified form will comprise a vessel containing a bed of the solid complexing agent with means for feeding gas into the vessel and through the bed, means for removing gas from the vessel, means for purging an impure stream, means for regulating pressure, means for removing relatively pure product and preferably automatic means for controlling the various valves in a manner to be described hereinafter.

Still speaking generally, the gaseous feed containing A and B will be passed into the vessel and through the complexing bed under pressure and temperature conditions which are suitable for the formation of a complex between A and the solid complexing agent, i.e. complex A, and unsuitable for the formation of a complex between the complexing agent and B. Where B will not under most circumstances form a complex with the complexing agent, e.g. where B is a paraffin, the operator of the process is permitted more latitude in selecting the operating conditions. The primary requirement is to maintain the partial pressure of A component sufficiently high and the temperatures sufficiently low to permit the formation of complex A to the degree desired. Where, however, B is capable of forming a complex, it may in some cases be necessary to critically adjust the temperature and pressure variables to avoid any substantial formation of complex B. When the vessel is pressured as indicated, A component will be chemically adsorbed and at the same time unreacted A and B will be continuously removed. This pressure or complexing cycle may last from about 10–200 seconds or longer and in any event for a time which is insufficient to permit the temperature in the bed to exceed the dissociation temperature of complex A. At the end of the complexing or pressure cycle the valve permitting the through gases to escape is closed and the fresh feed containing A and B is cut off. Simultaneously a valve is opened to permit the removal of a purge stream containing most of the residual B and unreacted A from the vessel. This purge may last for 1 to 15 seconds or longer, and will preferably but not necessarily be stopped before the partial pressure of A drops below the dissociation pressures of complex A at the temperature of the bed. When the purge cycle is completed, a product line valve is then opened depressuring the vessel to below dissociation pressures permitting the recovery of relatively pure product A. Thus the basic process comprises three short duration cycles which are (1) a complexing or high pressure cycle, (2) a purge or depressuring cycle and (3) a dissociation or low pressure cycle.

Defining the types of separations applicable to the present process with more particularity, A may represent any of the lower olefins, i.e. ethylene, propylene and the butylenes; polyolefins such as propadiene (allene), the butadienes, the pentadienes; and the various acetylenes, e.g. methyl acetylene, ethyl acetylene, vinyl acetylene; etc. The unsaturated hydrocarbon may be cyclic in nature as for example aromatics having an unsaturated side chain such as styrene. Cycloolefinic compounds, such as cyclopentadiene, cyclopentene, cyclohexene, and cycloheptene, also form complexes with the solid complexing agents referred to. Additionally, carbon monoxide forms a complex with CuCl as well as other solid salts and may be separated from hydrocarbons in the manner indicated. B represents a paraffin or an unsaturated hydrocarbon which has a dissociation pressure higher than A at the complexing temperatures employed. More specific examples of A and B are shown in the drawings and are described hereinafter.

The various complexes formed between different unsaturated hydrocarbons and cuprous chloride, as well as the other solid complexing agents are well known in the art and the recitation of additional examples of complex forming unsaturated hydrocarbons is not believed necessary.

Insofar as the complexing agents are concerned, there may be employed the various solid salts of Group I-B monovalent metals, i.e. Cu (I), Au (I), Ag (I); the solid salts of periods 5 and 6 metals of Group VIII, such as Pt (II), Pd (II), Ir (II), Rh (I), Ru (I), Os (I), or mixture thereof. The salts may be employed in their pure state or in admixture with other substances such as a carrier or the like. It is preferable to have the solid complexing agent in a form with sufficiently high surface area so that maximum contact between the gaseous hydrocarbon molecules and the metal ions is effected during the process. Insofar as the anionic portion of the salt is concerned, there may be employed the various halides, e.g. chloride, bromide, iodide; nitrates, sulfates, phosphates, and other inorganic salts. Additionally, there may be employed various organic salts such as the salts of lower molecular weight fatty acids, e.g. formate, acetate, propionate, and the like. Further, the solid complexing agent may comprise the metal ion in association with or supported on an ion exchange resin or other carrier such as 5 or 13 A. molecular sieve.

To define the process and apparatus in more detail, reference may now be had to the drawing wherein one embodiment of the apparatus is shown in FIGURES I–III. FIGURE I diagrammatically shows the apparatus with the valves adjusted for operation during the complexing cycle of the process. FIGURE II shows the same apparatus with the valves adjusted for the purging or depressuring cycle of the process, and FIGURE III discloses the apparatus with the valves positioned for the dissociation or reduced pressure cycle. To illustrate, a feed comprising an unsaturated hydrocarbon A and a close boiling saturated hydrocarbon B is fed in vapor phase via line 10 through open valve 11 via line 12 into vessel 13. Vessel 13 is preferably columnar having a fixed bed of solid complexing agent such as cuprous chloride. The bed may occupy the entire vessel or any portion of it. Preferably there will be little or no space between the ends of the bed and the ends of the vessel in order to minimize the purge required to obtain relatively pure A. The mixture AB passes through the bed at a pressure and temperature which promotes the formation of complex A. B and unreacted A will pass via line 14 through valve 15 and may be recovered via line 16. This stripped or off gas will contain a higher ratio of B to A than in the original feed. Valve 15 may be a simple orifice or other pressure regulating means to restrict the flow of gas and thereby permit the buildup or maintenance of a desired pressure within vessel 13. Insofar as the duration of the complexing cycle is concerned, it is preferable to avoid prolonged contact between the complexing agent and component A due to the heat of reaction involved. The timing of this cycle may be controlled by a clock type device, by temperature sensitive means or by pressure sensitive means. If it is desired to stop the flow of feed into vessel 13 when the pressure has reached two atmospheres, a pressure sensitive device may be attached to the vessel 13 which will at this pressure automatically close valve 11. Alternatively, if the particular complex dissociates at a certain temperature, e.g. 35° C., a temperature sensitive device may be attached to the vessel or in fact inserted in the bed which will activate the valves in the manner indicated before the temperature has reached the dissociation point, e.g. 25° C. Regardless of the particular means employed to adjust the valves, it is evident that the bed will now contain complex A with residual component B as well as some uncomplexed component A, the amounts depending on the pressures involved as well as the size of the vessel, nature of the complexing agent, and so forth. At this point the operator or automatic means will close all of the valves except valve 17 which can be opened to permit a reduction in pressure to a level at which the complex will dissociate and in this case the product will be removed under pressure via line 21. Since, however, there will be some residual B component in the bed at the end of the complexing cycle, it is preferable for the purposes of obtaining high purity A to purge gas from the bed as shown in FIGURE II.

In FIGURE II feed inlet valve 11 as well as valves 15 and 17 are shut and valve 19 is opened to permit a purge stream to exit via line 20. The purge stream is preferably cut off before the pressure in vessel 13 drops below the dissociation pressure of complex A so that very little if any of complex A will dissociate and be purged via line 20. If the pressure drops below the dissociation pressure during the purge, the time period should be very short to minimize the degree of dissociation. This cycle may entail dropping the pressure from about 2 atmospheres to 1.5 atmospheres or the like with a dissociation pressure of about one atmosphere. As shown in FIGURE III, when sufficient purge has been effected so as to remove the bulk of component B from vessel 13, the purge stream valve 19 is then shut and product valve 17 is opened to permit a reduction to below dissociation pressure for a time sufficient to effect dissociation and removal of A via line 21.

In FIGURE III, as in the preceding two figures, the means for opening and shutting the various valves are preferably automatic.

As an alternate to or in conjunction with the purge cycle shown in FIGURE II, some of the pure product may be accumulated in a vessel or tank 22 via line 23 and used as backwash or sweep gas to obtain an even purer product A. Pure product from tank 22 may be fed into vessel via line 24 during the purge cycle in which case it will be desirable to purge at the opposite end of the bed as shown via line 20 or alternatively the product may be fed into the upper portion of the vessel 13 via line 25 shown in dotted lines and the purge line 26 will then be preferably positioned at the front end of the bed.

The following examples demonstrate a few of the many separations which can be effected by resort to the process described herein.

*Example I*

The apparatus comprised a columnar vessel 9 inches long having an internal diameter of one inch. The vessel was about 60% filled with solid cuprous chloride particles of approximately 10–40 micron size. The feed mixture consisted of 80 volume percent ethylene and 20 volume percent ethane and was passed into the vessel 13 at 7° C. via line 10 through valve 11 and line 12 until a pressure of 215 p.s.i. was obtained. Check valve 15 was adjusted to maintain the pressure within vessel 13 at 215 p.s.i. during this pressuring cycle while continuously withdrawing stripped gases via line 16. The bed temperature at the start of the pressuring cycle was 7° C. and rose to 20° C. after about 60 seconds at 215 p.s.i. When the temperature reached 20° C., feed valve 11 and check valve 15 were both shut and purge stream valve 19 was opened as shown in FIGURE II. The vessel was vented to atmospheric pressure for a short period of time, i.e. 12 seconds and valve 19 was then shut. Next, valve 17 was opened as shown in FIGURE III for 36 seconds, and there was obtained a mixture containing 95.3% ethylene and 4.7% ethane via line 21. This represents about 55% of the maximum theoretical yield under the conditions employed.

*Example II*

Under conditions similar to Example I and using a 50% ethylene and 50% ethane feed stream, a product was obtained from line 21 containing 76.1 percent ethylene and 23.1 percent ethane.

In both examples the vessel was as indicated 40% void of complexing particles not counting the void area within the bed. Much higher purities are obtained with a fully packed vessel.

In Examples I and II the vessel was purged to atmospheric conditions without substantial dissociation of the complex by utilizing a short purge cycle. Had the purge time been longer, the yield would have been lower. It is noted in the above Example I that with one pass the purity of ethylene product was raised from 80 to >95% without the benefit of a sweep gas such as shown in FIGURES II and III of the drawing. Utilizing the sweep gas, both higher yields and purities can be obtained under a given set of pressure and temperature conditions.

To demonstrate an alternate and more commercially applicable process and apparatus, reference is now had to FIGURE IV of the drawings which discloses a two-vessel system for the separation and/or concentration of unsaturated hydrocarbons. In this process gaseous feed AB is passed into the vessel 42 containing solid complexing agent via lines 40 and 41 and valve 43. During the pressuring cycle of vessel 42, vessel 42' will be undergoing dissociation and purge cycles and vice versa as will be described. In the pressuring cycle of vessel 42 valve 43 is open to permit the AB mixture to enter into vessel 42 and three-way valve 44 is adjusted to permit the exit of stripped gases from vessel 42 via line 45, valve 44 being of the pressure regulating type to permit an adjustment of the pressure within vessel 42. Conditions in vessel 42 are maintained at a sufficient pressure and at a temperature to permit the complexing of A. It is to be understood that when speaking of pressures within vessel 42, the partial pressure of the complexing hydrocarbon is the critical factor. For example, if the feed gases contain only minor amounts of the A component, it will be necessary to adjust the total pressure upwardly in order to obtain sufficient partial pressure of the A component to permit the complex formation. However, in cases where B can also complex, the maximum pressure will be limited to a level where the partial pressure of B remains below the value required to form a complex from B. This adjustment will be apparent to those skilled in the art.

After a predetermined period based on time, temperature, or pressure, valves 43 and 44 are automatically shut and three-way valve 49 is opened to permit a purge from vessel 42 via line 46 thereby reducing the pressure in vessel 42 for the purge cycle. The purge cycle should be short in duration if it is to vent vessel 42 to pressures below the dissociation pressures of the complex A. If on the other hand the purge is regulated to reduce the pressure to a point above the dissociation pressure of the complex, a longer purge time may be utilized. Variations of the purge cycle are therefore within the discretion of the operator. The purge stream may be recovered via line 46 and will contain higher concentrations of B than the feed mixture. At the completion of the purge cycle or alternatively during the purge cycle, relatively pure product A from tank 47 may be passed through the complexing bed via line 48 acting as a sweep gas. Sweep gas may exit via line 46 with the regular purge, or valve 44 may b opened to permit the sweep gases to exit via line 45. Preferably the pressure in tank 47 of pure product A will be maintained at the same or at a higher level than the highest pressures in vessel 42. This may be accomplished by compressor means 50 and 50'. After the purge and sweep cycles, all valves leading to and from vessel 42 except valve 51 will be shut. Valve 51 will then permit the gases formed by dissociation of the complex to exit via line 53 as pure product. Sufficient pure product A will be passed into tank 47 via line 52 and compressor 50 in order to maintain the sweep gases readily available and under sufficient pressure.

It is now apparent that during the pressuring cycle of vessel 42, vessel 42' which will have been pressured with A previously and which contains complex A will be undergoing purge, sweep, and depressuring cycles by the appropriate positioning of valves 44, 49, 43', 51', and compressor 50'. Vessel 42' will undergo its pressure cycle during the purge and dissociation cycles of vessel 42. In this manner pure product A may be continuously withdrawn via line 53.

While in the cases cited it will be advantageous to operate the complexing vessel at pressures greater than atmospheric, in other cases it will be preferable or necessary to operate the complexing cycle under subatmospheric pressures, i.e. less than 760 mm. Hg. The term "pressure" accordingly is used herein in its absolute sense such that feeding AB into the complexing vessel at 300 mm. Hg will be considered for the purposes of this application to be included by the term "pressuring."

When operating the complexing cycle under reduced pressures a rearrangement of the compressors to effect the gas transfer will, of course, be required.

To further illustrate this embodiment of the invention reference is now had to Example III showing a process utilizing this apparatus in the separation of butadiene and butenes.

*Example III*

In this example the feed AB comprises butadiene and isobutylene in a mole ratio of 2:1. The complexing will take place in this specific case under subatmospheric pressures and a blower or the like will be required downstream from the complexing beds such as on line 45 in order to evacuate the beds to the desired subatmospheric pressure. In any event, the butadiene-isobutylene mixture is fed bia line 40 and 41 into vessel 42 which is completely packed with solid discrete particles of cuprous chloride and pressures are maintained at about 700 mm. at an initial bed temperature of 39° C. Under these conditions, the butadiene will complex with the cuprous chloride and the isobutylene will not. After permitting a contact time between the butadiene and the bed of about 120 seconds purge valve 49 is then opened and the bed is evacuated with the aid of a vacuum pump or blower, not shown, to a pressure of about 200 mm. Hg for about five seconds. At 40° C., these pressures are sufficient to prevent the bulk of butadiene complex formed from dissociating. For the sweep gas cycle pure, or relative pure butadiene product is taken from tank 47 which may be maintained at one atmosphere or higher pressures and passed via line 48 through the complexing bed and removed via line 46 at reduced pressures of 200 mm. Hg for an additional five seconds. At the end of the sweep cycle valve 49 is closed and the appropriate valves are opened with sufficient vacuum to reduce the pressure in the vessel to below about 50 mm. Hg by vacuum means not shown, thus permitting the dissociation of the complex and removal of pure butadiene product via line 48. Approximately one-fifth of the butadiene product is passed into vessel 47 to be used as sweep gas for the same cycle which will then occur in vessel 42' as indicated previously. The remaining product is recovered via line 52. If desired, to avoid the vacuum requirements for dissociation of the complex, an operating temperature of 65° C. or above can be used which will permit dissociation of the complex at atmospheric pressure or above. In general, the operating pressure can usually be brought to the levels of most convenience by adjusting the operating temperature.

Example IV

In this example the feed AB comprises butadiene and ethyl acetylene in a mole ratio of 100 to 1. The complexing will take place in this embodiment at superatmospheric pressures, but the dissociation may take place at either sub- or superatmospheric pressure. In any event, the butadiene-ethyl acetylene mixture is fed via line 40 and 41 into vessel 42 which is completely packed with solid discrete particles of cuprous chloride and pressures are maintained at about 2 atmospheres at an initial bed temperature of 50° C. Under these conditions the butadiene will complex with the cuprous chloride and the ethyl acetylene will not. After permitting a contact time between the butadiene and the bed of about 200 seconds, purge valve 49 is then opened and the bed is evacuated with the aid of a vacuum pump or blower, not shown to a pressure of about 300 mm. Hg for about 5 seconds. At 50° C. these pressures are sufficient to prevent the bulk of the butadiene complex from dissociating. The sweep gas cycle is the same as in Example III except for the higher bed pressure of 300 mm. Hg. At the end of the sweep, cycle valve 49 is closed and the appropriate valves are opened with sufficient vacuum to reduce the pressure in the vessel to below about 100 mm. Hg by vacuum means not shown, thus permitting the dissociation of the complex and removal of pure butadiene product via line 48. Approximately one-fifth of the butadiene product is passed into vessel 47 to be used as sweep gas for the same cycle which will then occur in vessel 42' as indicated previously. The remaining product is recovered via line 52.

So that the skilled artisan may be able to determine the appropriate conditions in the system described heretofore, reference may be had to FIGURES V, VI, VII, VIII and IX of the drawings which show dissociation pressure curves of carbon monoxide and the more common unsaturated hydrocarbons which are found in light petroleum fractions from various sources such as steam cracking. FIGURE V shows the dissociation pressures for ethylene, propylene, and isobutylene complexes with CuCl. FIGURE VI shows the dissociation pressures of the various acetylenes complexed with CuCl. FIGURE VII shows dissociation pressures of various diolefins complexed with CuCl, FIGURE VIII shows the dissociation pressures of various olefins and acetylene with CuBr complexes, and FIGURE IX shows dissociation pressures of CO and ethylene.

Additionally, the following Table of Conditions shows the broad ranges of temperatures, pressures and time which may be utilized for specific separations and also included is a specific example for each separation. These ranges are illustrative only and the specific conditions will depend to a large extent on the ratio of A to B in the feed mixture. It is clear, however, that in the complexing cycle the partial pressure of A must be above its dissociation pressure for the temperature employed and where B is reactive the partial pressure of B must be below its dissociation pressure.

TABLE OF CONDITIONS

| Components | | Complexing cycle | | | Purge cycle | | | Dissociation cycle | | |
|---|---|---|---|---|---|---|---|---|---|---|
| A | B | Temp., °C. | Pressure, p.s.i.g. | Time, sec. | Temp., °C. | Pressure, p.s.i.g. | Time, sec. | Temp., °C. | Pressure, p.s.i.g. | Time, sec. |
| Ethylene (Range) | Ethane | −35−+90 | −13.2−+2,700 | 5−180 | −35−+90 | −14−1,000 | 3−20 | −35−90 | −14−1,000 | 12−200 |
| (Example) | | 0 | 500 | 30 | 10 | 37 | 10 | 0 | 0 | 40 |
| Butadiene (Range) | Isobutylene | 30−120 | −13.7−330 | 20−200 | 30−120 | −14−150 | 3−20 | 30−120 | −14−150 | 20−220 |
| (Example) | | 39 | 44 | 200 | 50 | −9.4 | 10 | 40 | −13 | 210 |
| Propylene (Range) | Propane | −35−20 | −13.2−135 | 5−180 | −35−20 | −14−50 | 3−20 | −35−20 | −14−50 | 12−200 |
| (Example) | | −10 | 44 | 60 | 0 | 22 | 10 | −10 | 0 | 70 |
| C⁴ Acetylenes (Mixed) (Range) | Butadiene | 30−120 | −13.7−330 | 20−200 | 30−120 | −14−150 | 3−20 | 30−120 | −14−150 | 20−220 |
| (Example) | | 39 | 44 | 200 | 50 | −9.4 | 10 | 40 | −13 | 210 |
| Carbon Monoxide (Range) | Hydrogen | 0−100 | 0−2,000 | 10−200 | 0−100 | −11.7−300 | 3−20 | 0−100 | −14−200 | 20−220 |
| (Example) | | 40 | 1,000 | 200 | 50 | 29 | 10 | 40 | 0 | 210 |
| Carbon Monoxide (Range) | Ethylene | −35−100 | −13.2−2,000 | 5−180 | −35−100 | −14−300 | 3−20 | −35−100 | −14−200 | 12−200 |
| (Example) | | 40 | 265 | 30 | 50 | 25 | 10 | 40 | 0 | 40 |
| Propadiene (Range) | Propylene | −35−150 | −14−150 | 5−180 | −35−150 | −14.2−50 | 3−20 | −35−150 | −14.2−50 | 12−200 |
| (Example) | | 0 | 38 | 60 | 10 | −11.7 | 10 | 0 | −14 | 70 |

NOTE.—The higher pressures are used with the higher temperatures in most cases.

What is claimed is:

1. A process for the separation of a low molecular weight unsaturated hydrocarbon from a mixture containing it and a more saturated hydrocarbon having approximately the same molecular weight which comprises continuously passing said mixture in gaseous form and at elevated pressures through an absorption zone containing a bed of a solid cuprous halide complexing agent under a partial pressure of said unsaturated hydrocarbon sufficient to promote the formation of a complex between said unsaturated hydrocarbon and said solid complexing agent for 10 to 200 seconds whereby said complex is formed, continuously removing from said zone a gaseous stream containing a reduced amount of said unsaturated hydrocarbon, stopping the flow of said mixture to said zone and purging at least a portion of the gases contained therein by reducing the pressure within said zone for a time insufficient to effect substantial dissociation of the complex formed, subsequently maintaining the pressure within said zone below the dissociation pressure of said complex for a time sufficient to dissociate at least a substantial portion of said complex, recovering from said zone said unsaturated hydrocarbon having relatively high purity and resuming the passage of said mixture through said zone at active absorption and complex formation conditions.

2. A process in accordance with claim 1 wherein after the flow of said mixture to said vessel is stopped, said unsaturated hydrocarbon in a relatively pure state is passed through said bed in said vessel as a sweep gas in amounts sufficient to remove from said vessel substantial amounts of the more saturated hydrocarbon remaining in said bed after the formation of said complex.

3. A process in accordance with claim 2 wherein said relatively pure unsaturated hydrocarbon is employed as a sweep gas during the purge cycle.

4. A process in accordance with claim 2 wherein said relatively pure unsaturated hydrocarbon is employed as a sweep gas after said purge cycle.

5. A process as defined in claim 1 in which the unsaturated hydrocarbons are $C_2$–$C_5$ monolefins and said more saturated hydrocarbons are $C_2$–$C_5$ paraffins.

6. A process as defined in claim 1 in which the unsaturated hydrocarbons are $C_3$–$C_5$ diolefins and said more saturated hydrocarbons are $C_3$–$C_5$ monoolefins and paraffins.

7. The process of claim 1 in which the cuprous halide is cuprous chloride.

References Cited by the Examiner

UNITED STATES PATENTS

| | | | |
|---|---|---|---|
| 2,289,773 | 7/42 | Gilliland | 260—677 |
| 2,386,354 | 10/45 | Schulze et al. | 260—681.5 |
| 2,386,355 | 10/45 | Schulze et al. | 260—681.5 |
| 2,386,358 | 10/45 | Schulze et al. | 23—97 |
| 2,865,970 | 12/58 | Thomas | 260—677 |
| 2,913,505 | 11/59 | Van Raay et al. | 260—677 |
| 2,963,517 | 12/60 | Scofield | 260—666 |
| 2,966,531 | 12/60 | Louis | 260—676 |

ALPHONSO D. SULLIVAN, *Primary Examiner.*

MAURICE A. BRINDISI, BENJAMIN HENKIN,
*Examiners.*